United States Patent [19]

Kletecka

[11] Patent Number: 5,190,710
[45] Date of Patent: Mar. 2, 1993

[54] METHOD FOR IMPARTING IMPROVED DISCOLORATION RESISTANCE TO ARTICLES

[75] Inventor: George Kletecka, Fairview Park, Ohio

[73] Assignee: The B. F. Goodrich Company, Akron, Ohio

[21] Appl. No.: 659,213

[22] Filed: Feb. 22, 1991

[51] Int. Cl.$^5$ .......................... D01F 1/04; D01F 1/06
[52] U.S. Cl. .......................................... 264/78; 8/497; 8/597; 8/613; 8/661; 8/662; 264/211; 524/88
[58] Field of Search ...................... 264/78, 211; 8/497, 8/513, 594, 597, 611, 613, 661, 662; 524/88

[56] References Cited

U.S. PATENT DOCUMENTS

| | | | |
|---|---|---|---|
| 4,035,323 | 7/1977 | Mathis | 524/99 |
| 4,291,093 | 9/1981 | Wishman et al. | 264/211 X |
| 4,816,507 | 3/1989 | Cantatore et al. | 524/100 |
| 5,049,600 | 9/1991 | Kletecka | 524/88 |

OTHER PUBLICATIONS

Uzelmeier, C. W. "How Heat and Light Affect Pigmented Polypropylene", *SPE Journal,* vol. 26 (May 1970), pp. 69-74.

Leu, K. W. et al. "Recent Development in UV-Stabilization of Polypropylene Fibers", presented at the Plastics Institute of Australia Inc. Residential Technical Seminar (1974).

Carlsson, D. J. et al. "The Photooxidative Degradation of Polypropylene. Part II. Photostabilization Mechanisms", *Journal of Macromolecular Science-Rev. Macromol. Chem.,* C14(2), 1976, p. 157.

Steinlin, F. et al. "Influence of Pigments on the Degradation of Polypropylene Fibers on Exposure to Light and Weather", presented at the 19th International Man-made Fiber Conference (Austria 1980).

Allen, N. S. et al. "Interaction between Antioxidants and Hindered Piperidine Compounds in the Photostabilization of Polypropylene: Influence of Processing History", *Polymer Photochemistry,* vol. 1 (1981), pp. 111-121.

Allen, N. S. et al. "Photo-Stabilization Action of Para-Hydroxybenzoate Compound in Polyolefins—Part I: Thermal and Photochemical Behavior in Polypropylene Film", *Polymer Degradation and Stability,* vol. 5 (1983), pp. 241-266.

Wishman, M. "Stabilization of Polypropylene Fibers", 1984.

Allen, N. S. et al. "Photo-Stabilizing Action of Para-Hydroxybenzoate Light Stabilizer in Polyolefins: Part III—Antioxidant Behavior and Additive/Pigment Interactions in High Density Polyethylene", *Polymer Degradation and Stability,* vol. 10 (1985), pp. 1-13.

Allen, N. S. et al. "Photo-Stabilizing Action of Para-Hydroxybenzoate Light Stabilizer in Polyolefins: Part IV—Catalyst Effects and Additive Interactions in Linear Low Density Polyethylene", *Polymer Degradation and Stability,* vol. 12 (1985), pp. 363-372.

*Primary Examiner*—Leo B. Tentoni
*Attorney, Agent, or Firm*—Alfred D. Lobo

[57] ABSTRACT

Excellent color stabilization as well as integrity is obtained in thin film and fibers exposed to bright sunlight at relatively high temperature, in polyolefin (PO) articles pigmented with blue and green phthalocyanine, and red azo and disazo pigments. The pigment is combined with two 'large molecule' primary stabilizers, the first a piperidyl-based (PDYL) hindered amine light stabilizer (HALS), and the second, a 3,5-disubstituted-tert-butyl-4-hydroxybenzoate (3,5-DHBZ). The first contains at least two polysubstituted piperidyl rings in its molecule; the second is a hindered phenol with an ester group in the para- position. Stabilization of the PO's color is obtained for as long as the PO articles themselves are stabilized by the combination of primary stabilizers, typically, their useful life. With the combination, the pigmented articles are not only thermooxidatively and light-stabilized, but there is exceptionally low color fade. Because fibers may be extruded twice for better distribution of pigment, a small amount, no more than 0.1 phr of secondary melt-stabilizers, may be used. Blue-green- and red-pigmented PO articles exhibit less than a ±3 change in color (color fading) due to degradation of the pigment, over a period of exposure resulting in absorption of 1240 Kjoules/m$^2$. Such exposure of pigmented articles, deemed equivalent to normal outdoor use over a period of more than 10 years, results in essentially no visible loss of color due to degradation of the pigment.

9 Claims, 6 Drawing Sheets

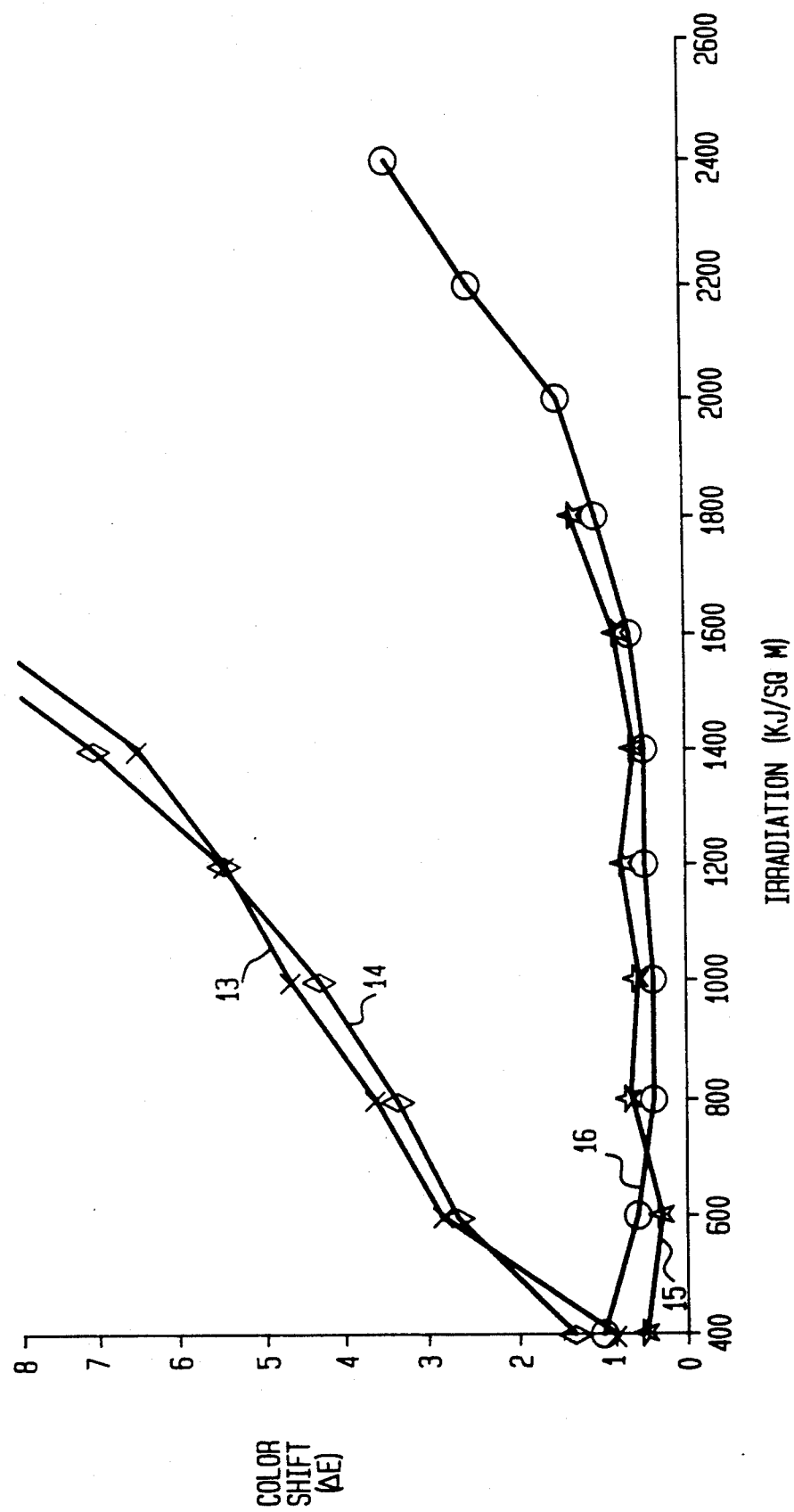

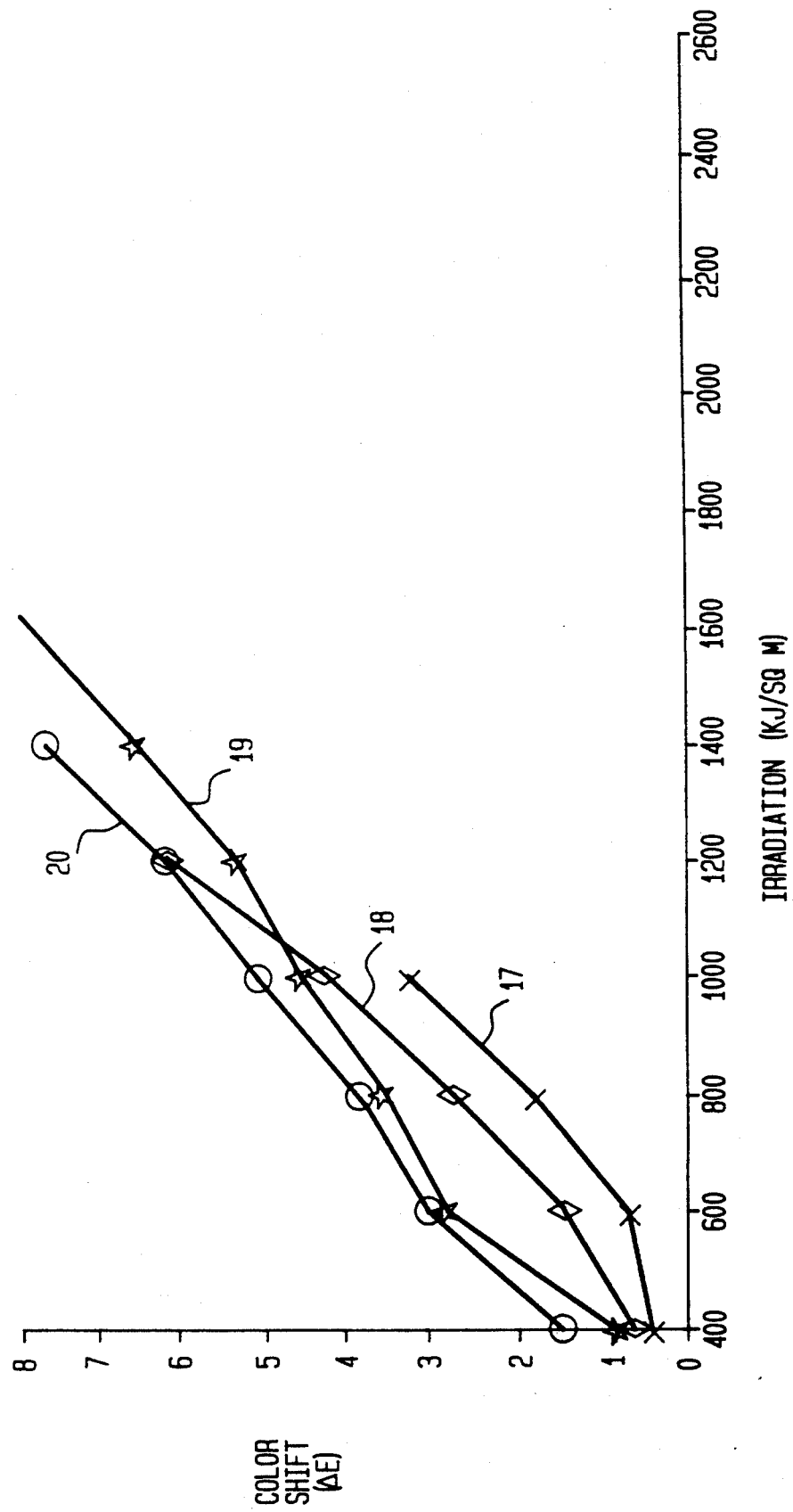

METHOD FOR IMPARTING IMPROVED DISCOLORATION RESISTANCE TO ARTICLES

BACKGROUND OF THE INVENTION

Over the past decade, the use of pigmented synthetic fibers and thin films has grown apace despite the known proclivity of such fibers and thin films to change color long before they lose their integrity. A large proportion of such fibers and thin films are formed from stabilized polyolefins, and other normally solid predominantly ethylene-and propylene-containing copolymers (together referred to hereafter as "PO" for brevity), and are used for a host of different applications.

Retention of colors red, blue, yellow, and orange, and shades of these colors, derived from azo, disazo and phthalocyanine pigments, in PO fibers and thin films exposed to sunlight over their useful life, is of great practical value in clothing, drapes and other articles made from woven or non-woven fabrics of the pigmented PO fibers. But Red 144, Orange 34 and Yellow 93 are known prodegradants; and, PO pigmented with these pigments, not only degrades the PO but it loses its pigmentation due to chemical degradation of the pigment even before the PO itself is degraded past the point where the articles serve their intended use.

This invention is directed to a particular combination of specific hindered piperidyl-based (PDYL) compounds, known as hindered amine light stabilizers (HALS), having plural polysubstituted piperidyl rings in a molecule, which HALS is combined with a 3,5-disubstituted-4-hydroxybenzoate (generically referred to as "3,5-DHBZ"), provides surprisingly good stabilization, provided the pigmented PO is either in the form of fibers less than 50 microns ($\mu$) thick, or, in the form of film less than 50$\mu$ thick, and further providing the pigment is red, blue or green, and shades thereof, in particular classes, namely azo, disazo and phthalocyanine pigments. By "polysubstituted" piperidyl ring, I refer to a ring in which the N-adjacent $C^3$ and $C^5$ atoms are either disubstituted or substituted with at least one cyclic substituent.

Stabilizing fibers used in fabrics against degradation is a particularly difficult problem because such fibers are so thin (less than 50$\mu$ in diameter. See "The Photooxidative Degradation of Polypropylene. Part II. Photostabilization Mechanisms" by Carlsson D. J. and Wiles, D. M. *J. Macromol. Sci.—Rev. Macromol. Chem.*, C14(2), 155-192 (1976)). Light striking the surface of a fiber has a very short distance to travel since additives (absorbers) used at a conventional level, say 0.1 phr (parts per hundred of resin), cannot function to protect the polymer which degrades because of its inherent absorptivity. The well-founded expectation is that because most films and fibers have a cross-section less than 50$\mu$ in thickness, adequate protection by UV absorption alone is impossible (see Text. Res.J. 39 243 (1969, J. E. Bonkowski). Further, the sensitivity of PP homopolymer articles to surface photooxidation implies that the UV absorption alone may be of only limited use even in the protection of thick moldings because of the massive surface damage which must result in the presence of the normal amount of a uniformly distributed UV absorber (see *Macromolecules* 4 174 (1971), Carlsson and Wiles). Both of these conclusions are factual confirmation of the effects of Beer's law.

The effect of degradation as a function of depth, measured from the surface exposed to UV radiation, on stabilized polypropylene, was investigated by K. W. Leu who presented his findings at the Plastics Institute of Australia Inc. 1974 Residential Technical Seminar. He exposed only one side of PP plaques to 150 Kly (kilolangleys) in an outdoor weathering station in South Africa, then sectioned thin slices (microtomed) of the plaques, starting at the exposed surface, dissolved them, and measured the viscosity of the solution.

The results were presented in a graph reproduced herein as FIG. 1, in which the dashed line A is for unexposed PP, which of course shows maximum viscosity and no degradation, therefore is parallel to the abcissa along which thickness in millimeters is plotted. The line A is drawn along the abcissa for a total thickness of 78.7 mils (2.0 mm).

Line B, the lower parallel line, is for plaques stabilized with 0.3% of a piperidyl-based HALS. The ordinate indicating some degradation, measured by viscosity as before, is about 1.7 viscosity units, quantified by the height of the line identified by the legend $S_1$.

Curve C plots viscosity as a function of thickness for plaques stabilized with 0.3% of a UV absorber (UVA), for example, a benzophenone or benzoate. This curve starts near the intersection of the axes indicating the viscosity is zero at the surface of the first section, then rises steeply and begins to plateau at about 2.2 units, at a depth of about 0.35 mm (13.8 mils). The ordinate marked $S_2$ indicates that the improvement in stability provided by the 0.3% UVA is about 0.5 units (the difference between 2.2 and 1.7). Referring further to curve C, but at a depth of 50 microns (0.005 mm), it is seen that the ordinate identified as $S_3$ measures up to about 0.1 viscosity unit. This represents a minimal level of stabilization provided by 0.3% UVA alone in the first section (a zone 50$\mu$ thick), taken near the surface.

Curve D presents the degradation of plaques stabilized with a combination of 0.15% UVA + 0.3% HALS. Beyond a depth of about 0.35 mm it is seen that the stabilization provided is only slightly better than that provided by 0.3% UVA by itself, indicating very little contribution from the HALS. If the effect of the HALS, as depicted by line B, was additive, curve D would show much greater stabilization (be much higher viscosity) at a depth greater than about 0.35 mm.

Referring further to curve D at the ordinate identified by the letter $S_4$ at a depth of 50 microns, the height of this ordinate (about 1.8 viscosity units) represents the level of stabilization provided by 0.3% HALS + 0.15% UVA. Thus it is seen that at a depth of 50$\mu$ (0.005 mm), the illustrated combination of HALS and UVA provides no more than the additive stabilization one would expect them to provide.

Curve E relates to use of an antioxidant and is irrelevant to the subject matter at hand.

Understanding the foregoing, there was every reason to believe that a combination of a low level of piperidyl-based HALS, about 0.3% or less, in combination with a low level of a UVA, about 0.3% or less, would provide no more than a marginally greater stabilization than the HALS itself, within a 50 micron zone. Certainly there was nothing to suggest that the addition of a phthalocyanine or an azo pigment, known to be a prodegradant with piperidyl-based HALS in several synthetic resinous systems, to the combination of piperidyl-based HALS and benzoate (but not benzophenone) stabilizer, would reasonably be likely to provide a sudden boost in stabilization, rather than a merely additive effect.

As one would expect, loss of color is a particularly acute problem for PO fibers irrespective of the pigment used. It so happens that the problem is the most serious with phthalocyanine, azo and disazo pigments (the latter two being together referred to herein as "azo pigments") which in most other respects are ideal pigments for polyethylene (PE) and polypropylene (PP). Typical of such disazo pigments is Red 144 (common name), and the monoarylide or diarylide azo pigments Orange 34 and Yellow 93; typical of phthalocyanine pigments are (a) Blue 15, Blue 16 and Blue 29 with shades of blue available, for example, as Blue 15:1 through Blue 15:6; and, (b) Green 7, Green 36-3Y and Green 36-6Y. All are used in huge (tons) quantities to pigment PO fibers. For unknown reasons, however, we find that the orange and yellow colors in PO are not stabilized by the PDYL+3,5-DHBZ combination.

Phthalocyanine pigments have a generally flat tetra benzo tetra azo porphin structure. The pigments are usually made by the reaction of a phthalic acid derivative at a temperature of about 190° C. with a source of nitrogen such as urea and a metal or metal salt. Molybdates, vanadates, and certain compounds of titanium have been found to be useful catalysts for this condensation reaction.

Red 144 (Registry No. 5280-78-4) is a disazo condensation pigment. The yellow pigments are either monoarylides or diarylides. The orange pigments are azo based and may or may not include a benzimidazolone structure.

To combat the problem of color fading, a better solution is constantly being sought to decelerate color loss which is at least as important as stabilization of the fibers of the PO. With particular respect to articles of Red 144-pigmented PP fibers which are in high demand, the use of Red 144 both hastens their degradation when exposed to sunlight, and degrades their physical properties over time. The combined effects subject the articles to a two-pronged attack on their longevity in normal use, thus vitiating their marketability.

In particular, fabrics made with Blue 15- and Red 144-pigmented PP fibers and stabilized with piperidyl-based HALS, are especially popular in automobiles, boats, outdoor clothing and other such uses where the fibers degrade at such an unacceptably high rate upon exposure to sunlight, that red articles are soon transformed into non-uniformly colored articles sporting a wide spectrum of unwanted shades of pink and orange; articles of blue fibers turn milky. The obvious way to cope with this color degradation problem is to use far more pigment than is required to provide the desired color, so that upon suffering the expected color degradation, the coloration of the remaining non-degraded pigment will maintain acceptable, if not the original, color. Except that 'loading up' the HALS-stabilized fibers with more phthalocyanine pigment than necessary may lead to "bronzing"; loading up with Red 144 or other azo pigment generates a high proclivity towards reaction of pigment with the PDYL, and with other additives such as antioxidants ("AO"s) and antiozonants used to provide melt-stability to the PP. Further, increasing the concentration of pigment above about 1 phr may produce "blooming" of the pigment long before degradation of either the pigment or the fiber.

This invention particularly relates to the stabilization of fibers of PO, specifically of PE and PP fibers colored with phthalocyanine and azo pigments which provide red, blue and green colors, and shades thereof; more particularly, it does not relate to those azo pigments which provide either an orange, or yellow color.

It is known that several stabilizers, particularly the piperidyl-based HALS, by themselves, provide excellent stabilization of PO to heat, light and ultraviolet radiation, and, some hindered phenol stabilizers are antioxidants which provide both excellent thermoxidative stabilization, and light stabilization of PO, but such stabilization does not extend to that of color in phthalocyanine or azo-pigmented PO.

In U.S. Pat. No. 4,035,323, Mathis discloses that specific piperidyl compounds in combination with 3,5-DHBZ provide protection against sunlight. The specific compounds were tested in unpigmented 5 mil thick films with the assumption that if pigmented, the stabilization effect of the combination will endure, irrespective of the type of pigment used. This assumption was unfounded, at least with respect to azo and phthalocyanine pigments, as is evidenced by data presented hereafter.

The foregoing assumption as to the inertness of pigments, irrespective of their chemical structure, was dispelled relative to synergistic combinations of primary and secondary antioxidants in low concentration of each component (0.05% w/w each) in a study titled "Photo-Stabilising Action of a p-Hydroxybenzoate light Stabiliser in Polyolefins: Part III—Antioxidant Behaviour and Additive/Pigment Interactions in High Density Polyethylene" by Allen, Norman S. et al *Polymer Degradation and Stability* 10 (1985) 1–13. The same study pointed out that antagonism (not synergism) was exhibited at higher concentrations of the antioxidants. The study showed that a particular benzoate (Cyasorb UV 2908) with copper phthalocyanine (1% w/w) was more effective than when a synergistic combination of antioxidants (Irganox 1076 and Weston 618) were added. Though they tested a combination of Tinuvin 622 1-(2-hydroxyethyl)2,2,6,6-tetramethyl-4-hydroxypiperidine, succinic acid polymer; (a PDYL) and 3,5-DHBZ with thick film pigmented with titanium dioxide, they did not test Tinuvin 622 with an azo or phthalocyanine pigment in their films. The combination of Cyasorb 2908 (3,5-DHBZ)+Irganox 1076 and Tinuvin 622 (oligomeric HALS with several piperidyl groups) showed embrittlement at 2935 hr. The combination of Cyasorb 2908 (3,5-DHBZ)+Irganox 1076 and Tinuvin 770 N,N'-bis(2,2,6,6-tetramethyl-4-pieridinyl)hexamethylenediamine,2,4,6-trichloro-1,3,5-triazine, 1,1,3,3-tetramethylbutylamine polymer; (a PDYL with two poly-substituted piperidyl groups) showed embrittlement at 3085 hr. The combination of titanium dioxide pigment and the PDYL was not tested; nor was the addition of the 3,5-DHBZ to the foregoing combination. There was no suggestion that the addition of a PDYL to the 3,5-DHBZ in thin pigmented films (titanium dioxide, or any other) might produce different results, nor was there any reason to believe that their data, obtained by testing 200–300μ thick films, would not be applicable to films less than 50μ thick, or fibers.

More recently, a PDYL commercially available as Chimassorb 944, poly[6-[(1,1,3,3-tetramethylbutyl)amino]-s-triazine-2,4-diyl][2,2,6,6-tetramethyl-4-piperidinyl)imino]]; has been combined with a 3,5-DHBZ and a phosphite commercially available as Ultranox (see Japanese publication JP-230401 (1987) to Sumitomo Chem Ind KK). But there is no indication that such a combination might have been notably effective to stabilize any pigment or dye.

It is also known that numerous pigments for PO, by themselves, provide a significant level of stabilization to PO, but there are many which have no noticeable effect on stability, and still others which accelerate degradation, that is, are prodegradants. To date, the only reliable method of determining to which group a pigment belongs, is by actually testing it in a particular substrate of interest. It is known, for example, a pigment which is a stabilizer in PP may be a prodegradant in a polyacetal.

Both phthalocyanine and azo pigments are known to have good color stability. They also provide some measure of light stability by virtue of their ability to block the path of radiation, thus shielding the pigmented polymer. Such small measure of light stabilization is observed in PP at about 0.4 phr. However, in combination with a stabilizing amount of a known PDYL primary stabilizer, which functions as a "radical trap" stabilizer, stabilization provided by 0.4 phr of an azo pigment is not substantial.

By a "primary" stabilizer, I refer to one which provides either long term thermoxidative stability during conditions to be encountered during use, or, UV light stability in bright, direct sunlight. Melt extrusion stability, especially for fibers of PO, is provided by a secondary stabilizer. Though the present invention does not require the use of any secondary stabilizer, in those instances, for example in fiber-spinning, where the melt is extruded at about 270° C. (for PP fibers) more than once to obtain better pigment distribution, the PO may contain a small amount, no more than 0.1 phr, of a melt (or "process") stabilizer.

Typically, several additives are combined in PP before it is thermoformed, whether spun into fiber, injection molded, blow molded, extruded, etc., each additive being specifically designed to provide a different zone of stabilization, the main zones being (a) melt extrusion stability, (b) long term thermal stability during conditions expected to be encountered during use, (c) uv light stability in bright direct sunlight, and by no means of least importance, (d) stable tinctorial strength to maintain the desired color. Combining several additives known to be effective for each purpose, in PP articles is not likely to produce the desired results because of objectionable side effects due to interaction between the additives.

For example, thiodipropionate compounds such as dilauryl (DLTDP) and distearyl (DSTDP) help control melt-stability despite an odor problem, and certain phosphites control melt flow while depressing the tendency of PP fibers to yellow because the fibers usually contain a hindered phenol AO. The hindered phenol AO increases long term stability but accelerates yellowing. It is known that a hindered phenol AO and a thiodipropionate are most effective when used together. Certain PDYL HALS provide not only excellent uv stability but also such good long term thermal stability that the PP fibers will outlast some of the pigments used to color them. Yet such a HALS is typically combined with a hindered phenol and a phosphite.

Conventional wisdom dictates that if fibers stabilized with one or more stabilizers and a particular pigment meet the expectations of stability in the marketplace, then molded and extruded articles, other than fibers, will also be satisfactorily so stabilized. The opposite is not true. Therefore, pigments are selected with an eye to their effect upon the processing of PP fibers, the stability requirements of the end product, the pigment's interaction with the other additives to be used, the color requirements, and the cost of producing the pigmented PP fibers. The thrust towards using inexpensive PP fibers in the automobile industry where the colors red and blue are in high demand, decreed that, despite their high cost, Red 144 and phthalocyanine blue be used, because of their intense tinctorial strength and color stability; and, that Red 144 and Blue 15 in particular, be combined with a compatible uv stabilizer. It was expected that one of the most damaging factors in the stability of Red 144-pigmented and Blue 15-pigmented PO fibers would be their interaction with the PDYL HALS used.

The commercial use of red and blue PP fibers requires that the color stability of the PP fibers be such that it equals the useful life of a fabric or other article containing the fiber, which article is exposed to heat and light. Because the stabilizers used generally affect color though they are not regarded as colorants, and, pigments affect thermal and uv light stability even if not known to have such activity, one cannot estimate what the net effect of the interactions might be. (see "Influence of Pigments on the Light Stability of Polymers: A Critical Review" by Peter P. Klemchuk, *Polymer Photochemistry* 3 pg 1–27, 1983).

I continued my tests with numerous combinations of stabilizers in Blue 15- and Red 144- and other azo-pigmented fibers, screening the samples to determine whether an unacceptable level of color loss was obtained before the fibers disintegrated. It was unimportant whether the combinations were of a primary with a secondary stabilizer, or, of co-primary stabilizers. The effectiveness of each combination was measured by the degree of degradation of the pigmented fibers both by visual observation, and by "scratch testing" (described herebelow) the surface of exposed fibers.

Fiber degradation is a phenomenon which is easily visible to the naked eye upon inspection of a degrading pigmented yarn exposed either in a Weather-O-Meter in the presence of moisture, or, to bright sun (tests are conducted in the Florida sun) under ambient conditions of humidity. Unstabilized Blue 15- or Red-144 pigmented PP fibers exposed to the Florida sun show no fading because the pigmented fibers degrade far more rapidly than the pigment, which results in continual sloughing off of layers of fiber, exposing bright undegraded pigment. Degradation of stabilized fiber is characterized by (i) a fuzzy, peach-skin-like appearance of the surface of the fabric (made with the pigmented fibers), and (ii) the problem of fading color.

For the simple reason that a large volume of PP goods are either extruded or molded, one way or the other, there was an urgent need to find an effective PDYL HALS which would provide such articles, as well as pigmented fibers, with adequate longevity under light-degrading conditions. To this end I searched for the appropriate HALS and for a compatible and effective co-stabilizer or "synergist" which might, in combination, provide the desired stabilization. Since there was no indication whether such a synergist should be, or might likely be either an AO or a uv-absorber, the search had to consider both.

As one would expect, some pigments enhance heat and light stability of PP fibers stabilized with a particular AO or uv-absorber. Other pigments have the opposite effect. Until tested, one cannot predict with reasonable certainty, what the effect will be. For example, with a nickel-containing stabilizer, Red 101 (iron oxide) is a prodegradant. With the more effective HALS, both Yellow 93 and Red 144 are prodegradants. The effect of these pigments in stabilized PP fibers could not have been predicted by their behavior in unstabilized pigmented fibers, or by their behavior with a different stabilizer.

With a nickel-containing stabilizer, Red 144 (unlike Red 101) is a stabilizer (not a prodegradant), but Red 144 is a prodegradant with Tinuvin 770. Yellow 93, a stabilizer when no other stabilizer is present, is neutral with nickel stabilization but is a prodegradant with Tinuvin 770 (see "Stabilization of Polypropylene Fibers" by Marvin Wishman of Phillips Fibers Corporation). Specifically with respect to red PP fibers, the problem was to find a combination of stabilizers which circumvented the proclivity of Red 144 to degrade the PP fibers and plaques when the pigment is combined with a conventional AO and uv light stabilizer. Because Red 144 was a prodegradant, it seemed desirable to use only as much of it as would provide the desired tinctorial effect for the required period of time, namely the useful life of the stabilized fiber.

The effect of a large number of pigments on the stability of PP fibers stabilized with Tinuvin 770 has been reported by Steinlein and Saar (see "Influence of Pigments on the Degradation of Polypropylene Fibers on Exposure to Light and Weather", paper presented at the 19th International Manmade Fiber Conference, Sept. 1980 in Austria).

In the same vein, like other workers before me, I tested a large number of combinations of primary stabilizers with Blue 15 and Red 144, both in fibers and in plaques.

The chemical peculiarity about an effective PDYL-based HALS is that it contains multiple polysubstituted piperidyl rings in a single molecule which is sometimes an oligomer. The most preferred of such piperidyl-based HALS are those which contain at least one triazine ring, and at least one substitutable position on each triazine ring is linked to a polysubstituted piperidyl ring.

Chimassorb 944 and Cyasorb UV 3346 poly[[6-(morpholinyl)-1,3,5-triazine-2,4-diyl][(2,2,6,6-tetramethyl-4-piperidinyl)imino]-1,6-hexanediyl[(2,2,6,6-tetramethyl-4-piperidinyl)imino]]; are HALS of relatively large size containing a polysubstituted hindered piperidyl ring and a triazine ring. Each HALS is an oligomer in which the repeating unit combines a hexamethylene diamine having polysubstituted piperidyl substituents on the N atoms, the substituted diamine unit being connected to a triazine ring in which one of the other substituents is either tert-octylamine (Chimasssorb 944), or, morpholone (Cyasorb 3346), and the other substituent is a hexamethylene diamine unit.

The unexpected and particularly noteworthy boost of color-stability derived from a 3,5-DHBZ, is thought to be due to the electron-withdrawing effect of the para-position of the ester substituent, but the highly surprising effect when the ester group is aryl, for example, 2,4-di-t-butyl is thought to be attributable to the photo-Fries rearrangement (when the 3,5-DHBZ is exposed to actinic radiation) which rearrangement can occur only with the aryl ester substituent. Other esters, particularly those derived from alicyclic or long chain aliphatic alcohols are comparably effective.

Prior to the publication of some of the studies which set forth a framework within which the foregoing factors are to be considered, a manufacturer of the 3,5-DHBZ supplied a sales flyer in which its UV-Chek AM-340 (2,4-di-tert-butyl phenyl ester of 3,5-di-tert-butyl-4-hydroxy-benzoic acid) stabilizer was stated to be "cost effective or synergistic with hindered amine light stabilizers, as well as, other stabilizer types, e.g., nickel organics, benzophenones, benzotriazoles, etc. in various polymers." The flyer further stated "In polymers, particularly polyolefins, UV-Chek AM-340 is a highly effective ultraviolet light stabilizer. It is especially effective in extruded and blown films, fine fibers, and molded articles. AM-340 is a white crystalline powder, and has no effect on the initial color of the polymer it is added to, and no effect on changing the shade of pigmented formulations. AM-340 is particularly useful in stabilizing pigmented polymers, especially in cases where the pigment itself contributes to the degradation of the polymer."

To the extent that such all-encompassing benefits of using AM-340 were not sales-oriented, they were based on data obtained with oriented PP film in $1 \times 100$ mil and $2 \times 100$ mil samples, and on 20 mil HDPE and 4 mil LLDPE plaques pigmented with 0.5% titanium dioxide. No observed color changes are provided, nor is there any indication that they were measured and found to show no change. As pointed out hereinabove, from the data presented by Leu, there was every reason to believe that such improvement as might be obtained by combining a piperidyl-based HALS with a 3,5-DHBZ would be additive at best when used in PO which is less than 50 microns thick. Further, the desirability of pigmented fibers was well known since before the time of publication of the sales flyer and, the lack of data on fibers is conspicuous by its absence.

SUMMARY OF THE INVENTION

It has been discovered that a combination of two primary stabilizers, each used at low level no more than 2 phr, provides an unexpectedly effective stabilization system for polyolefin (PO) thin films and fibers having a diameter less than $50\mu$, when the films and fibers are pigmented with a phthalocyanine, azo or disazo pigment (either of the latter two, or both are referred to as "azo pigment") provided it is neither orange or yellow. One primary stabilizer contains multiple polysubstituted hindered piperidyl groups ("PDYL"); and the other is a 3,5-disubstituted-4-hydroxybenzoate ("3,5-DHBZ"). By "polysubstituted" we refer to the N-adjacent carbon atoms in the piperidyl ring are disubstituted, or substituted with a cyclic substituent.

It is therefore a general object of this invention to provide a stabilizer system for incorporation into an azo or phthalocyanine pigmented PO, which system affords an unexpectedly high boost in the stabilization effectiveness attributable to each primary stabilizer in the PO, and minimizes such color degradation of the PO as is typically the result of an interaction of stabilizers which lack unique compatibility relative to phthalocyanine, azo and disazo pigments. Such unique compatibility is exhibited in fibers of PO stabilized with the system; the fibers having improved strength and discoloration resistance compared to that of similar fibers from identically pigmented PO, but stabilized with several other commercially available hindered amines and a hindered phenol, and tested by exposing the fibers to infrared, visible and actinic radiation.

It has also been discovered that a stabilizer system consisting essentially of the combination of PDYL and 3,5-DHBZ, in combination with only enough secondary stabilizer such as a hindered phenol and a phosphite, to provide melt stability during processing, is unexpectedly effective for stabilizing blue and green phthalocyanine-pigmented, and red azo-pigmented PP fibers; and shades thereof. The stabilization is not only against thermoxidative and light degradation of the PO, but also against discoloration attributable to degradation of the pigment.

Such degradation is particularly noticeable in thin PO film and PO fibers exposed to bright sunlight during outdoor use, for example in fabric used in an automobile, during its normal use over a period of many years. If the PDYL and the 3,5-DHBZ are each used in the range from about 0.1 phr to 2 phr, tinctorial strength of the pigment is maintained so that there is no objectionable change of color of the fibers or thin film for at least ten (10) years of normal use, even when the pigment is used in as small an amount as in the range from about 0.1 phr to about 1 phr, though as much as 2 phr may be used with greater risk of interaction of pigment and stabilizers.

It is therefore a general object of this invention to provide phthalocyanine and azo-pigmented PO film or fibers which have been stabilized against exposure to sunlight, by incorporating into the PO an effective amount of a combination of PDYL and 3,5-DHBZ primary stabilizers sufficient to stabilize the film or fibers so that, after exposure to bright sunlight during the useful life of the fibers, they exhibit essentially no visible color shift due to the presence of the pigment, and the fibers degrade acceptably even after irradiation with about 1000 Kjoules/m$^2$ in a SAE J1885 test, equivalent to about 10 years of normal usage of articles made with the pigmented film or fiber.

It is also a general object of this invention to provide a method for imparting improved strength and discoloration resistance to stabilized, phthalocyanine and azo-pigmented, extruded PO fibers and thin films less than 50$\mu$ thick, which method comprises, (i) incorporating into a melt from which an article of thin film or monofilament fiber is formed, an effective amount, sufficient to color the article but not more than 2 phr, of a phthalocyanine pigment or an azo or diazo pigment, in combination with two primary stabilizers substantially free of secondary stabilizers, so as to produce a phthalocyanine- or azo-pigmented article for outdoor use, a combination of stabilizers consisting essentially of an effective amount of PDYL and 3,5-DHBZ, each in an amount sufficient to stabilize the PO and decelerate discoloration of the pigmented PO, as evidenced by minimal color fading during the useful life of an article made with the pigmented PO. For harsh extrusion conditions such as multiple extrusion, a conventional melt-stabilizing secondary stabilizer, no more than 0.1 phr, or as much as is required for melt stabilization of the fiber, may be added to the combination of primary stabilizers and pigment.

It is a specific object of this invention to provide a method for stabilizing articles made from phthlalocyanine and azo-pigmented woven and non-woven PE or PP fibers, which method comprises, subjecting the pigmented fibers to an accelerated Xenon Arc Weather-O-Meter SAE J1885 test for absorption of 1240 Kjoules/m$^2$, deemed equivalent to more than the useful life of the fiber, with less than a $\pm 3$ units of color change (minimum change visible to the naked eye) due to degradation of the pigment; the PE and PP fibers being essentially free of a color stabilizer and having incorporated therein (1) from 20 parts per million (ppm) to about 1 phr, preferably from 0.1 to 1 phr, of a phthalocyanine or an azo pigment; (ii) from 20 ppm to about 2 phr, preferably from 0.1 phr to 1 phr of PDYL; and, (iii) from 20 ppm to about 2 phr, preferably from 0.1 phr to 1.5 phr, of 3,5-DHBZ, based upon the weight of the PO in the fibers or thin film less than 50 microns thick.

BRIEF DESCRIPTION OF THE DRAWING

The foregoing and other objects and advantages of my invention will appear more fully from the following description, made in connection with the accompanying graphs which illustrate the result-effectiveness of the combination of PDYL and 3,5-DHBZ in PP fibers pigmented with various azo pigments, but essentially free of a secondary stabilizer, that is, having no more than 0.1 phr of each, of a melt-stabilizing AO such as a conventional hindered phenol, and a phosphite.

FIG. 5 is a chart analogous to FIG. 3, except that the Red 144 and Orange 34 are each stabilized with (i) Chimassorb 944 only, and (ii) a combination of Chimassorb 944 and UV-Chek AM-340.

FIG. 6 is a chart analogous to FIG. 3, except that the it shows results using a different 3,5-DHBZ from UV-Chek AM-340 and the fibers are pigmented with Yellow 93 and Orange 34 each stabilized with (i) Chimassorb 944 only, and (ii) a combination of Chimassorb 944 and Cyasorb 2908.

Figure 1:
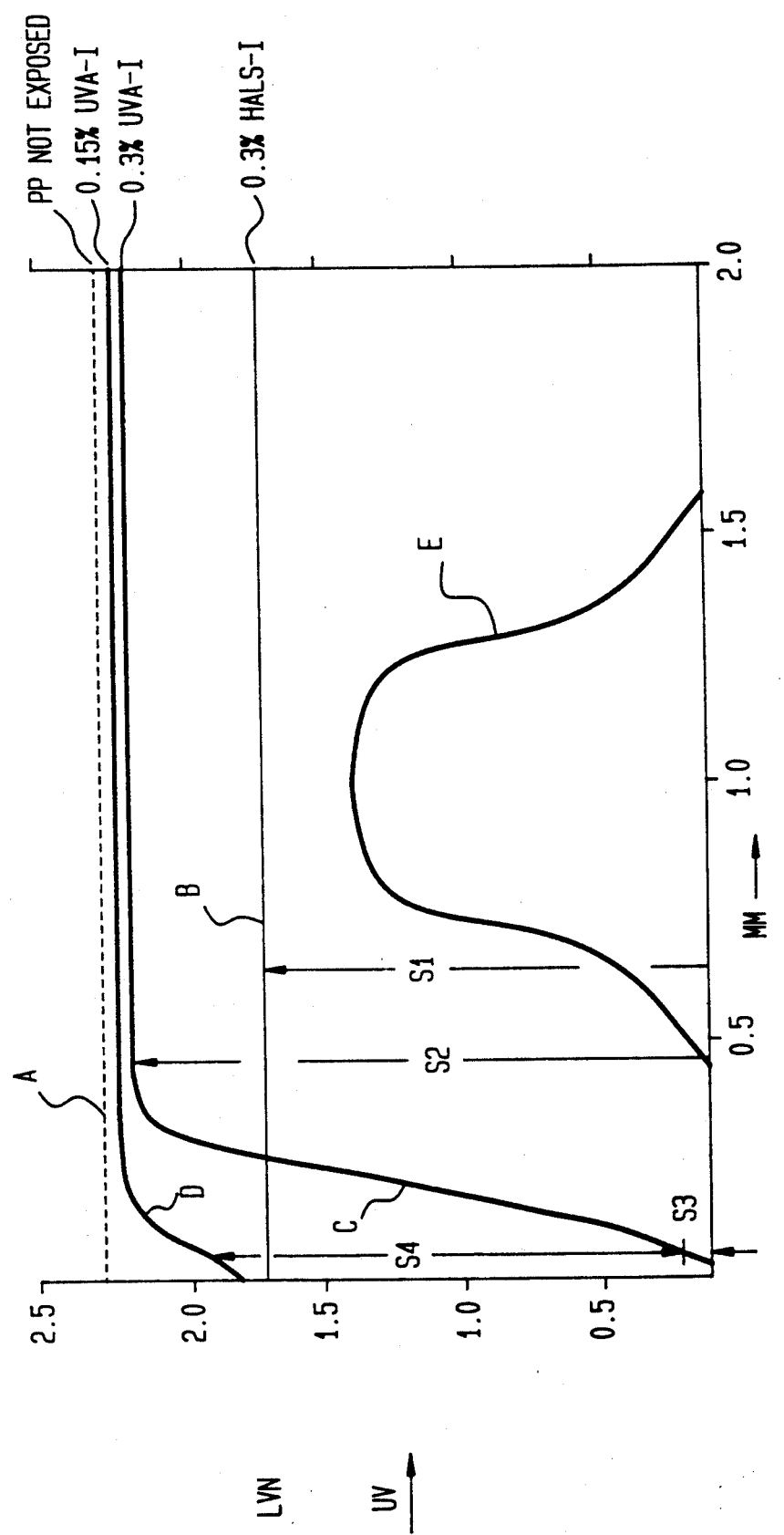
FIG. 1 is a graph charting several curves demonstrating the protection characteristics of a piperidyl-based (PDYL) hindered amine light stabilizer (HALS) and a UV absorber (UVA). This graph is reproduced from a paper presented by K. W. Leu.

All fibers in the samples tested were made from PP containing the designated amount of PDYL and 3,5-DHBZ, as well as 0.1 phr Irganox ® 3114 (a hindered phenol melt-stabilizer) and 0.08 phr Weston 626 (a phosphite melt-stabilizer).

DETAILED DESCRIPTION OF PREFERRED EMBODIMENTS

This invention is particularly directed to stabilization of phthalocyanine and azo-pigmented PO fibers, particularly PP fibers used in fabrics for automobile seats, carpets, dashboards, and rear decks; for clothing; for drapes, and indoor and outdoor carpeting. All such articles informal use may be exposed to sunlight, and typically are. The temperature inside a modern car with much glass (to reduce weight) and windows up, can reach 90° C. (hence the GM test with a black panel temperature of 89° C.). Hence the commercial need for stabilized pigmented PP and PE articles (see "Growing Trends in Automotive Textiles" by G. Robert Turner *Textile Chemist and Colorist* 17–18 Vol 20, No. 6, 988; "New Phillips Fiber for Automotive Market Stands Up to UV Rays". N/W Staff Report *Nonwovens World* pg 45–46, January 1989; "The Degradation of Automotive Upholstery Fabrics by Light and Heat" by Brian Milligan, pg 1–7 *Rev. Prog. Coloration* Vol 16, 1986).

In a particular embodiment, this invention provides an article made from a woven or non-woven fabric of phthalocyanine and azo-pigmented PP fibers. Woven fabrics are produced from yarn by any one of several weaving techniques. Non-woven fabric of PP may have a carded fiber structure or comprise a mat in which the fibers or filaments are distributed in random array. The fibers may be bonded with a bonding agent such as a polymer, or the fibers may be thermally bonded without a bonding agent. The fabric may be formed by any one of numerous known processes including hydroentanglement or spun-lace techniques, or by air laying or melt-blowing filaments, batt drawing, stitchbonding, etc. depending upon the end use of the article to be made from the fabric.

Incorporated in the PP, and preferably uniformly distributed in the PP melt before it is spun into filaments, is (i) a small amount, about 1 phr (based on the weight of all the polymer from which the article is formed), of phthalocyanine or azo pigment, and typically from 0.05 phr to about 0.75 phr; (ii) no more than 0.1 phr each of secondary stabilizer, namely a hindered phenol and a phosphite, required for melt-stabilization of the PP; (iii) from about 0.1 phr to about 1.0 phr, of PDYL; and (iv) from about 20 ppm to about 2 phr, and preferably from about 0.1 phr to about 1 phr, of a 3,5-DHBZ.

PDYLs useful in this invention are well known commercially available materials, illustrative examples of which are identified by the trademarks under which they are sold. These PDYLs include Chimassorb 119, Chimassorb 944, Tinuvin 144, Di-(1,2,2,6,6-pentamethyl-4-piperidinyl)-2-butyl-2-(3,5-di-tert-butyl-4-hydroxybenzyl)malonate; Tinuvin 622, Tinuvin 770, Cyasorb 3346, Topanex 500H 1,5-dioxaspiro-[5,5]-3,3-dicarboxylic acid, diester with 2,2,6,6-tetramethylpiperidin-4-al; and Hostavin N 20, structures of each of which, as well as their preparation, need not be reiterated herein as they are disclosed in detail in the following U.S. patents which are incorporated by reference thereto as if fully set forth herein: U.S. Pat. Nos. 3,640,928; 4,086,204; 4,232,131; 4,233,410; 4,233,412; 4,234,699; 4,299,926; 4,331,586; 4,701,485; 4,816,505; and 4,906,678; inter alia.

It is only PDYLs having multiple polysubstituted piperidyl groups in this limited class of PDYLs, and particularly those monomolecular ones having a relatively high MW in the range from about 850 to less than 2000, which in combination with the 3,5-DHBZ display the remarkable stabilization activity of phthalocyanine- and azo-pigmented PO, optionally in the presence of such a low concentration of secondary stabilizers.

The preparation of a 3,5-DHBZ ester is conventional and numerous such esters have been disclosed for use as stabilizers. Typically a 4-hyroxybenzoic acid with desired substituents at the 3- and 5- positions is prepared and reacted with a phenol having desired substituents at the 2- and 4-positions.

The 3,5-DHBZ is a 3,5-di-substituted-4-hydroxybenzoate structurally represented as:

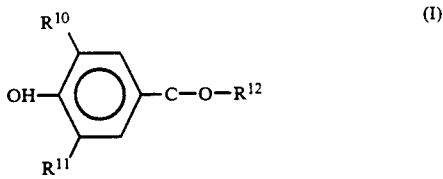

wherein $R^{10}$ and $R^{11}$ each represent $C_1$-$C_{12}$ alkyl, phenyl, naphthyl, $C_4$-$C_{12}$ cycloalkyl, and $C_1$-$C_8$ alkyl-substituted cycloalkyl, each alkyl substituent being $C_1$-$C_8$; and, $R^{12}$ represents a hydrocarbyl group selected from $C_{10}$-$C_{24}$ alkyl, $C_4$-$C_{12}$ cycloalkyl, $C_1$-$C_8$ alkyl-substituted cycloalkyl, and, 2,4-disubstituted phenyl wherein the substituents independently represent $C_4$-$C_{24}$ alkyl, $C_4$-$C_8$ cycloalkyl, and $C_1$-$C_8$ alkyl-substituted cycloalkyl.

Illustrative examples of 3,5-DHBZ stabilizers are:

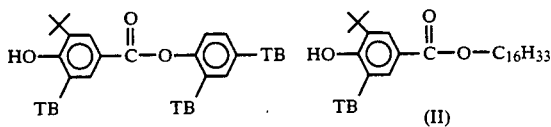

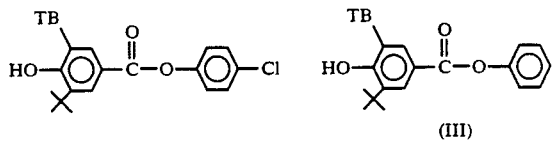

$+$ = TB = t-butyl

The polyolefin is typically propylene homopolymer, or copolymers of propylene with a minor amount of ethylene, or, polyethylene homopolymer, or copolymers of ethylene with a minor amount of propylene. If desired, to facilitate melt-processing of the PO, particularly if the PO is to be subjected to multiple thermoforming operations at a temperature above 200° C., a melt-stabilizing quantity of a secondary stabilizer may also be used, the amount being no more than is necessary to provide melt-stabilization, namely 0.1 phr. The preferred phthalocyanine or azo-pigmented, 3,5-DHBZ-stabilized PO has so small an amount of AO added to it that the AO does not make a sufficiently noticeable adverse contribution towards negative interaction upon exposure to sunlight, and is tolerable. Such a small amount of AO may be present in commercially available AO-free PP fibers, added thereto for process stability to facilitate manufacture of the fibers. Additives other than an AO may be added if it is known they do not adversely affect the desired color, or help degrade the physical properties of the PP fibers when exposed to sunlight. Such additives may include lubricants in addition to alkaline earth metal stearates, near-colorless or white fillers such as glass fibers or talc, and optical brighteners.

Preferred hindered phenol secondary stabilizers are 1,3,5-tris-(3',5'-di-t-butyl-4-hydroxybenzyl)-isocyanurate;

1,3,5-tris-(3',5'-di-t-butyl-4-hydroxybenzyl)-2,4,6-trimethylbenzene;

ethyleneglycol-bis(3,3-bis-3'-t-butyl-4'-hydroxyphenyl)-butyrate;
pentaerythrit-tetra-[3-(3,5-di-t-butyl-4-hydroxyphenyl)-propionate];
octadecyl-tetra-[3-(3,5-di-t-butyl-4-hydroxyphenyl)-propionate];
bisethyleneglycol-bis(3,3-bis-3'-t-butyl-4'-hydroxyphenyl)-propionate];
hexamethylene-1,6-di-[3-(3,5-di-t-butyl-4-hydroxyphenyl)-propionate]; and the like.

Preferred phosphite secondary stabilizers are (a) the symmetrical pentaerythritol phosphites represented by the structure

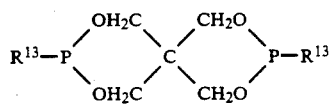 (IV)

wherein $R^{13}$ is derived from a $C_{12}$–$C_{24}$ monohydric alcohol preferably $C_{18}$ such as in Weston 618, or a di-$C_1$–$C_{12}$ alkyl-substituted phenol, preferably 2,4-di-t-butylphenol such as in Ultranox; and, (b) symmetrical triaryl phosphites represented by the structure

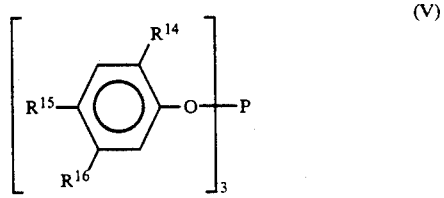 (V)

wherein $R^{14}$ represents t-butyl, 1,1-dimethylpropyl, cyclohexyl, or phenyl, and one of $R^{15}$ and $R^{16}$ is hydrogen and the other is hydrogen, methyl, t-butyl, 1,1-dimethylpropyl, cyclohexyl or phenyl.

If desired, secondary stabilizers other than a phosphite or hindered phenol may be used, and may be desirable with other pigment colors, but each secondary stabilizer is always used in an amount less than 0.1 phr, sufficient to provide adequate melt-stabilization but insufficient to accelerate discoloration with the phthalocyanine or azo-pigment used. Additional amounts of secondary stabilizers may be used, but with additional risk of causing side reactions, and with no economic justification for doing so. No conventional color stabilizer, other than such color stabilizing effects as may be attributable to such trace amounts of secondary stabilizers, if these are used, is either desirable or necessary.

Typically PP is polypropylene homopolymer, but may be a random or block copolymer of propylene and a monoolefinically unsaturated monomer X, (P-co-X) with up to about 30% by wt of X wherein X represents a minor amount of monoolefinically unsaturated monomer such as vinyl acetate, or a lower $C_1$–$C_4$ alkyl acrylate or methacrylate. Blends of such propylene polymers with other polymers such as polyethylene are also included within the scope of this invention. In an analogous manner, PE is typically polyethylene homopolymer, but may be E-co-X. For convenience, homopolymer PE or PP and copolymers E-co-X or P-co-X are together referred to herein as polyolefin PO, no distinction being made with respect to each as a substrate, compared to homopolymers and copolymers of ethylene and propylene. When phthalocyanine or azo-pigmented PO is to be stabilized, the PO preferably has a number average molecular weight Mn in the range from about 10,000 to about 500,000, preferably about 30,000 to about 300,000 with a melt flow index from 0.1 to 100 g/10 min when measured according to ASTM D-1238.

Solely for the purpose of facilitating processing of the PO melt, particularly for melt extrusion of the PO, a metal stearate such as calcium or zinc stearate in an amount insufficient to deleteriously affect the color of the fibers, preferably in the range from about 100 ppm to about 1500 ppm, is added.

Since a predominant concern is the desired color contributed by the phthalocyanine or azo pigment, only enough of the pigment is added to the normally water white PO to produce the desired color, but no more than 2 phr. The optimum amount of phthalocyanine or azo pigment for individual articles will depend upon the type of article, whether fibers, sheet or injection molded, for example, and the conditions under which the article is expected to be used. Further, the optimum amount will depend upon the particular azo pigment to be used, and the change in color which will be acceptable over a specified period of time.

The PDYL and 3,5-DHBZ stabilizers and the phthalocyanine or azo pigment, may readily be incorporated into the PO by any conventional technique at a convenient stage prior to thermoforming the PO. For example, in the melt-extrusion of PP to form fibers, the pigment and stabilizer may be mixed with the PP in dry powder form, or a suspension or emulsion of the stabilizer may be mixed with a solution, suspension, or emulsion of the polymer.

Articles made of phthalocyanine or azo-pigmented, stabilized PO fibers, and particularly fabrics, drapes and clothing made from PO fibers, once placed in service, are likely to be used for several years and are not likely to be exposed continuously to several years of bright sunlight. When noticeable fading of the pigment does eventually occur, the article has provided so large a proportion of its useful life that its color degradation is not objectionable.

In the comparative tests made and recorded in the following experiments, color change is measured according to the Standard Method for Calculation of Color Differences from Instrumentally Measured Color Coordinates, ASTM D 2244-85. The change in color measured in this manner does not reflect the peach-skin appearance due to broken fibers of degraded yarn. The useful life of the fabric is terminated when its surface becomes fuzzy as a peaches,. Visual inspection under an optical microscope shows that individual fibers in the matrix of the yarn are broken.

Polymer degradation is measured qualitatively by placing a sample of fabric under a low power optical microscope and scraping the surface of the yarn with a blunt spatula. When the fibers are readily broken wile the yarn is being scraped, the fabric has been degraded even if the color change is acceptably low.

The GM Weather-O-Meter tests are conducted as described in Summary of Test Conditions for SAE J1885 using a Xenon Arc Weather-O-Meter with controlled irradiance and water cooled lamp as follows;

|  | Light | Dark |
| --- | --- | --- |
| Irradiance watts/$m^2$ @ 340 nm | 0.55 | — |
| Black Panel Temp., °C. | 89 | 38 |
| Relative Humidity, % | 50 | 95 |

| -continued | Light | Dark |
|---|---|---|
| Cycle Time, hr | 3.8 | 1.0 |

Examples with Pigmented Thick Film and Monofilament Fibers

All samples are made from Profax 6301 PP having a nominal melt flow index of about 14. Films are prepared by dry blending the stabilizers (0.6 phr each) and pigment (0.75 phr), and extruding at 230° C. to form a rod about 0.5 cm in diameter, and the rod is comminuted to form pellets. The pellets are compression molded at 210° C. to form a 5 mil thick film.

Stabilized monofilaments are prepared from pellets made from rod which has been extruded twice at 230° C. The twice-extruded pellets are then extruded at 260° C. through a 40-hole spinneret to give about a 15 denier monofilament which is oriented 3:1. A bundle of oriented monofilaments is knitted into a fabric a piece of which is then used as a test sample.

All samples were tested under the conditions for SAE J1885 set forth hereinabove. The data is presented in the curves of the appended Figures.

All fiber samples containing only UV-Chek AM-340 failed at less than 450 Kjoules/m² irrespective of the level of stabilizer up to 0.6 phr. Accurate measurements for the time of failure were not made because 450 Kjoules/m2 represents the minimum period for which stability is required, equivalent to about 5 years of normal outdoor use of an automobile.

All fiber samples containing only the secondary stabilizers Irganox 3114 (0.1 phr), and Weston 626 (0.08) fail at about 150 Kjoules/m²; and all fiber samples containing only pigment at 0.75 phr level, irrespective of the pigment used, fail at about 150 Kjoules/m². Accurate measurements for the time of failure were not made because 150 Kjoules/m² represents too short a period relative to that for which stability is required.

All fiber samples containing only Chimassorb 944, 0.6 phr, fail at 1600 KJ/m² with a color shift at failure of 1.5 units; all fiber samples containing only Chimassorb 119, 0.6 phr, fail at 1600 KJ/m² with a color shift at failure of 1.4 units.

Figure 2:
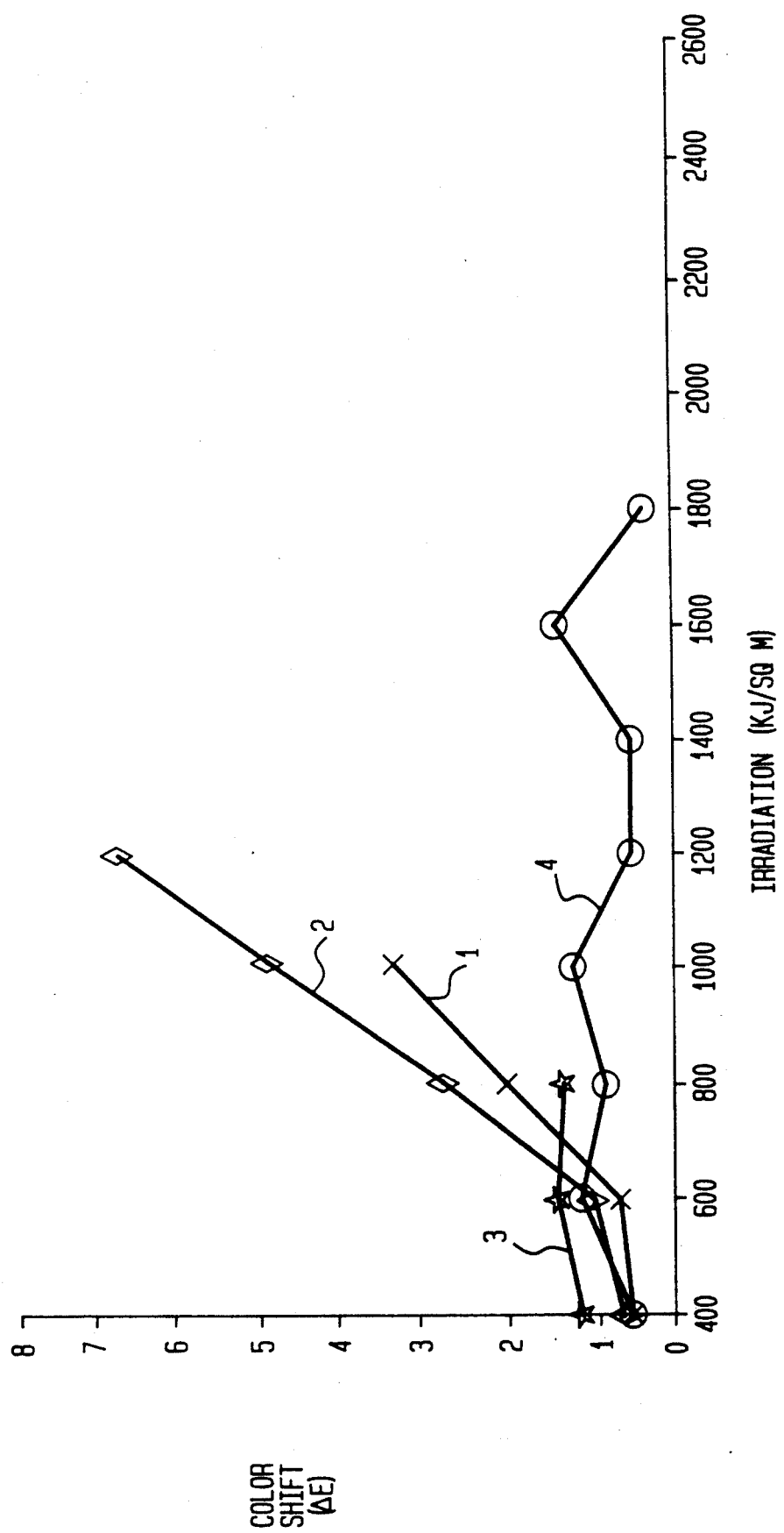
FIG. 2 is a chart graphically plotting the color shift or change in color ($\Delta$E) due to fading of a fabric made of PP fibers pigmented with Blue 15 and Yellow 93, and stabilized with (i) Chimassorb 944 (PDYL) only, and (ii) a combination of Chimassorb 944 and UV-Chek AM-340 (3,5-DHBZ), the data being set forth in several curves plotted as a function of the amount of energy absorbed (measured in a Weather-O-Meter) over a period of time.

Referring to FIG. 2, it is seen that fibers pigmented with 0.75 phr Yellow 93 and Chimassorb 944 alone at 0.6 phr, exceed a color shift ΔE of 3 units and fail at about 1000 KJ/m² (curve 1); fibers pigmented with 0.75 phr Yellow 93 and with Chimassorb 944 combined with UV-Chek AM-340, each at 0.6 phr, exceed a color shift ΔE of 3 units at about 800 Kjoules/m², even before those without the synergist, and fail at about 1200 KJ/m² (curve 2). With addition of the UV-Chek AM-340 synergist, the pigment acts as a prodegradant, and the primary stabilizers only a 20% increase in longevity.

As also seen in FIG. 2, fibers pigmented with 0.75 phr Blue 15 and Chimassorb 944 alone at 0.6 phr, never exceed a color shift ΔE of 3 units and fail at about 800 KJ/m² (curve 3); fibers pigmented with 0.75 phr Blue 15 and with Chimassorb 944 combined with UV-Chek 340, each at 0.6 phr, never exceed a color shift ΔE of 3 units even though they fail at about 1800 Kjoules/m² (curve 4). There is less of a color shift with addition of the synergist to the blue fibers, and the phthalocyanine pigment more than doubles the effect on longevity of the combination of stabilizers.

Figure 3:
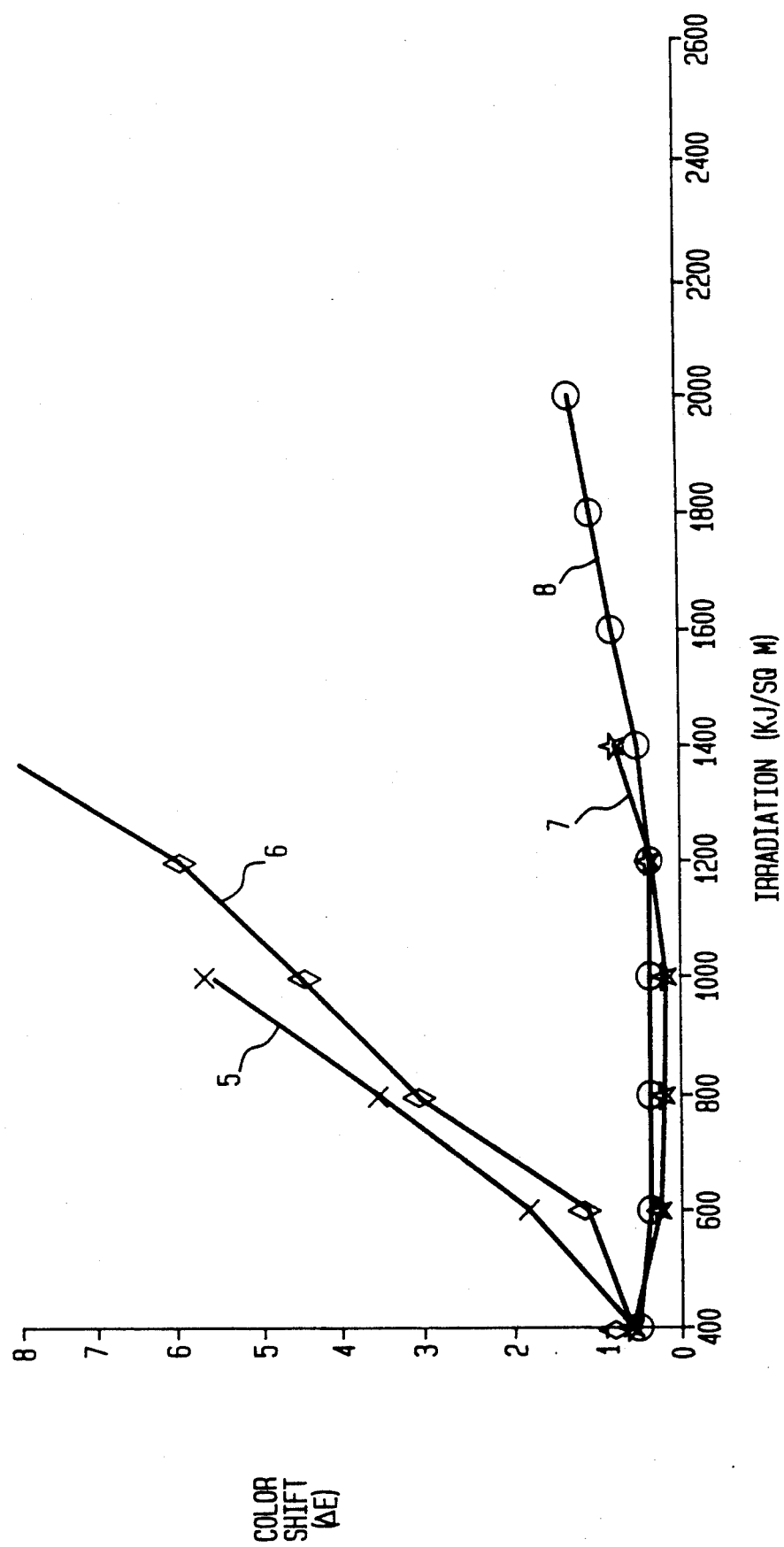
FIG. 3 is a chart analogous to FIG. 2, except that it is for Red 144 and Orange 34, each stabilized with (i) Chimassorb 119 1,3,5-triazine-2,4,6-triamine,N,N'''-[1,-2-ethanediylbis[[[4,6-bis-[butyl(1,2,2,6,6-pentamethyl-4-piperidinyl)amino]-1,3,5-triazine-2-yl]imino-3,1-propanediyl]]bis[N',N''-dibutyl-N',N''-bis(1,2,2,6,6-pentamethyl-4-piperidinyl)-; only, and (ii) a combination of Chimassorb 119 and UV-Chek AM-340.

Referring to FIG. 3, it is seen that fibers pigmented with 0.75 phr Orange 34 and Chimassorb 119 alone at 0.6 phr, exceed a color shift ΔE of 3 units at about 800 Kjoules/m² and fail at about 1000 KJ/m² (curve 5); fibers pigmented with 0.75 phr Orange 34 and with Chimassorb 944 combined with UV-Chek AM-340, each at 0.6 phr, also exceed a color shift ΔE of 3 units at about 800 Kjoules/m², but fail at about 1400 KJ/m² (curve 6). With addition of the UV-Chek AM-340 synergist, the pigment produces no significant improvement in color shift but the primary stabilizers provide 75% better longevity.

As also seen in FIG. 3, fibers pigmented with 0.75 phr Red 144 and Chimassorb 119 alone at 0.6 phr, never exceed a color shift ΔE of 1 unit and fail at about 1400 KJ/m² curve 7); fibers pigmented with 0.75 phr Red 144 and with Chimassorb 944 combined with UV-Chek AM-340, each at 0.6 phr, never exceed a color shift ΔE of 2 units and fail at about 2000 Kjoules/m² (curve 8). There is about the same color shift with addition of the synergist to the red fibers, and the disazo pigment allows about 43% improvement in longevity with the combination of stabilizers.

Figure 4:
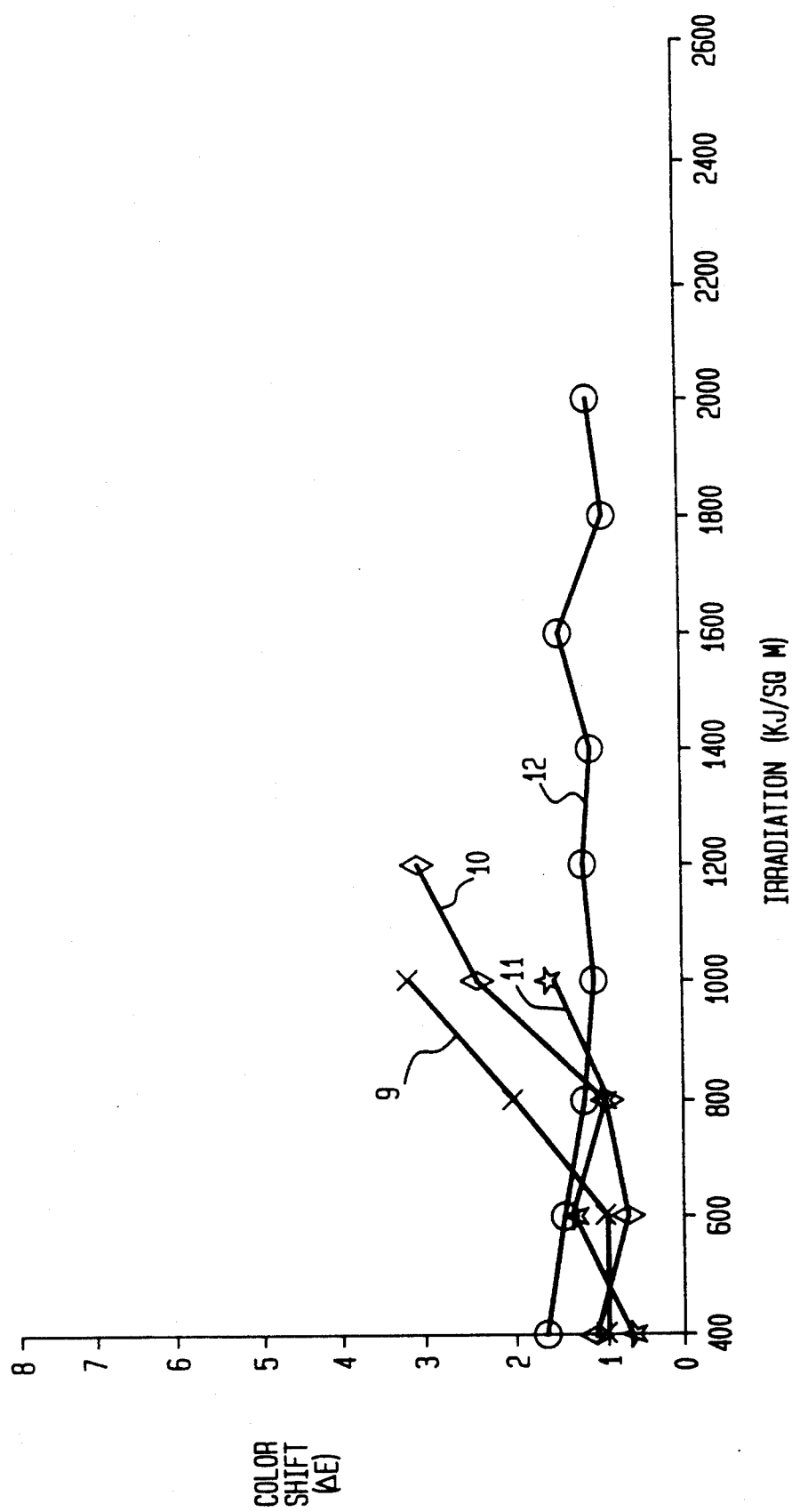
FIG. 4 is a chart analogous to FIG. 2, except that the Blue 15 and Yellow 93 are each stabilized with (i) Chimassorb 119 only, and (ii) a combination of Chimassorb 119 and UV-Chek AM-340.

Referring to FIG. 4, it is seen that fibers pigmented with 0.75 phr Yellow 93 and Chimassorb 119 alone at 0.6 phr, exceed a color shift ΔE of 3 units at about 950 Kjoules/m² and fail at about 1000 KJ/m² (curve 9); fibers pigmented with 0.75 phr Yellow 93 and with Chimassorb 119 combined with UV-Chek AM-340, each at 0.6 phr, do not exceed a color shift ΔE of 3 units at about 1200 Kjoules/m², at the same time as they fail (curve 10). With addition of the UV-Chek AM-340 synergist, the pigment produces significant (about 25%) improvement in longevity before visible color shift and the primary stabilizers provide about the same improvement in longevity.

As also seen in FIG. 4, fibers pigmented with 0.75 phr Blue 15 and Chimassorb 119 alone at 0.6 phr, never exceed a color shift ΔE of less than 2 units and fail at about 1000 KJ/m² (curve 11); fibers pigmented with 0.75 phr Blue 15 and with Chimassorb 119 combined with UV-Chek AM-340, each at 0.6 phr, also never exceed a color shift ΔE of less than 2 units, but they fail at about 2000 Kjoules/m² (curve 12). There is about the same color shift with addition of the synergist to the blue fibers, and the phthalocyanine pigment doubles the longevity of the fibers with the combination of stabilizers.

Referring to FIG. 5, it is seen that fibers pigmented with 0.75 phr Orange 34 and Chimassorb 944 alone at 0.6 phr, exceed a color shift ΔE of 3 units at about 600 Kjoules/m² and fail at about 1600 KJ/m² curve 13); fibers pigmented with 0.75 phr Orange 34 and with Chimassorb 944 combined with UV-Chek AM-340, each at 0.6 phr, also exceed a color shift ΔE of 3 units at about 600 Kjoules/m², but fail slightly before the fibers with no synergist (curve 14). With addition of the UV-Chek AM-340 synergist, the pigment produces no significant improvement either in longevity alone, or longevity before objectionable visible color shift.

As also seen in FIG. 5, fibers pigmented with 0.75 phr Red 144 and Chimassorb 944 alone at 0.6 phr, exceed a color shift ΔE of about 1 unit and fail at about 1800 KJ/m² (curve 15); fibers pigmented with 0.75 phr Red 144 and with Chimassorb 944 combined with UV-Chek AM-340, each at 0.6 phr, exceeds a color shift ΔE of less than 3 units only at failure at about 2400 Kjoules/m² (curve 16). There is about the same color shift up to about 1800 Kjoules/m² with addition of the synergist to the red fibers, and the disazo pigment provides about a 33% improvement in longevity of the fibers with the combination of stabilizers.

Referring to FIG. 6, there is shown curves 17 and 18 for fibers pigmented with 0.75 phr Yellow 93 without and with, respectively, 0.6 phr Cyasorb 2908 which has the structure (II); and curves 19 and 20 for fibers pigmented with 0.75 phr Orange 34, without and with 0.6 phr Cyasorb 2908. It is seen that a change in the structure of the 3,5-DHBZ does not significantly improve either the proclivity to color shift, or the longevity of these fibers.

From the foregoing it is evident that neither yellow- nor orange-pigmented fibers benefit from the use of the 3,5-DHBZ synergist which only acts as such with red and blue fibers.

Examples with Films 5 mm thick

Numerous samples about 5 cm × 5 cm, of films 5 mm thick are pressed and tested as described hereinabove. All samples containing a PDYL and a 3,5-DHBZ, each at 0.6 phr, in combination with each of the foregoing red, blue, orange and yellow pigments at 0.75 phr, failed before reaching 1000 Kjoules/m², regardless of which pigment, PDYL and 3,5-DHBZ was used. Accurate measurements for the time of failure were not made because 1000 Kjoules/m² (about 10 years) represents the minimum period for which stability is required.

A summary of the results for fiber containing PDYL and 3,5-DHBZ primary stabilizers, such at 0.6 phr, the pigment at 0.75 phr, Irganox 3114 (1 phr) and Weston 626 (0.08 phr), is listed in the following TABLE:

| Stab. 1 | Stab. 2 | Pigment | ( E) | KJ/m² |
|---------|---------|---------|------|-------|
| 944 | — | — | 1.5 | 1600 |
| 944 | AM-340 | — | 0.9 | 1800 |
| — | AM-340 | Blue 15 | 0.8 | 250 |
| 944 | AM-340 | Blue 15 | 0.8 | 1800 |
| 944 | UV2908 | Blue 15 | 0.8 | 1800 |
| — | UV2908 | Blue 15 | 1.1 | 250 |
| 144 | — | Blue 15 | 1.0 | 800 |
| 144 | AM-340 | Blue 15 | 1.5 | 1600 |
| 119 | — | Blue 15 | 1.2 | 1000 |
| 119 | AM-340 | Blue 15 | 1.2 | 2000 |
| 944 | — | Orang 34 | 9.7 | 1800 |
| 944 | AM-340 | Orang 34 | 10.4 | 1800 |
| 944 | UV2908 | Orang 34 | 7.8 | 1400 |
| 144 | — | Orang 34 | 4.7 | 1000 |
| 144 | AM-340 | Orang 34 | 6.6 | 1400 |
| 119 | — | Orang 34 | 5.8 | 1000 |
| 119 | AM-340 | Orang 34 | 8.5 | 1400 |
| 944 | — | Red 144 | 1.2 | 1800 |
| 944 | AM-340 | Red 144 | 3.0 | 2400 |
| 944 | UV2908 | Red 144 | 2.3 | 2200 |
| 944 | UV2908 | Red 144 | 4.1 | 2400 |
| 144 | — | Red 144 | 2.4 | 1000 |
| 144 | AM-340 | Red 144 | 0.7 | 1200 |
| 119 | — | Red 144 | 0.7 | 1400 |
| 119 | AM-340 | Red 144 | 0.5 | 1400 |

I claim:

1. A method for imparting improved discoloration resistance to an article made from thin film or monofilament of a polyolefin, comprising,
    (i) incorporating into a melt from which said film or fiber is formed, an effective amount, sufficient to color the article but not more than 2 phr, of a blue or green phthalocyanine pigment, or a red azo or disazo pigment, in combination with two primary stabilizers substantially free of secondary stabilizers, so as to produce a pigmented article for outdoor use, said combination of primary stabilizers consisting essentially of
    (a) a piperidyl-based (PDYL) hindered amine light stabilizer (HALS) having a molecular structure containing at least two polysubstituted piperidyl groups; and,
    (b) a 3,5-di-substituted-4-hydroxybenzoate having the structure

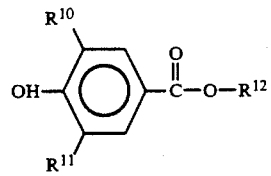

wherein
    $R^{10}$ and $R^{11}$ each represent a substituent selected from the group consisting of $C_1$–$C_{12}$ alkyl, phenyl, naphthyl, $C_4$–$C_{12}$ cycloalkyl, and $C_1$–$C_8$ alkyl-substituted cycloalkyl, each alkyl substituent being $C_1$–$C_8$; and,
    $R^{12}$ represents a hydrocarbyl group selected from the group consisting of $C_{10}$–$C_{24}$ alkyl, $C_4$–$C_{12}$ cycloalkyl, $C_1$–$C_8$ alkyl-substituted independently represent $C_1$–$C_{24}$ alkyl, $C_4$–$C_8$ cycloalkyl, and $C_1$–$C_8$ alkyl-substituted cycloalkyl; and,
    (ii) extruding said melt to form said monofilament having a diameter less than 50 microns, or said thin film having a thickness less than 50 microns; whereby said monofilament and said thin film fail to exhibit objectionable change of visible color over a period of at least ten years in normal use.

2. The method of claim 1 wherein said polyolefin is selected from the group consisting of a homopolymer of ethylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount of ethylene, and a random or block copolymer (P-co-X) wherein P represents propylene.

3. The method claim 2 comprising exposing said pigmented polyolefin in a Xenon Arc Weather-O-Meter SAE J1885 test for a period sufficient to absorb 1240 Kjoules/m², and resulting in less color change than ±3 units; and, said PDYL is a hindered amine having at least two polysubstituted piperidyl groups in each molecule, and is selected from the group consisting of Di-(1,2,2,6,6-pentamethyl-4-piperidyl)-2-butyl-2-(3,5-di-tert-butyl-4-hydroxybenzyl)malonate;
1-(2-hydroxyethyl)2,2,6,6-tetramethyl-4-hydroxypiperidine, succinic acid polymer;
N,N'-bis(2,2,6,6-tetramethyl-4-pieridinyl)hexamethylenediamine,2,4,6-trichloro-1,3,5-triazine, 1,1,3,3-tetramethylbutylamine polymer;
poly[[6-(morpholinyl)-1,3,5-triazine-2,4-diyl][(2,2,6,6-tetramethyl-4-piperidinyl)imino]-1,6-hexanediyl[(2,2,6,6-tetramethyl-4-piperidinyl)imino]];
1,3,5-triazine-2,4,6-triamine,N,N''''-[1,2-ethanediyl-bis[[[4,6-bis-[butyl(1,2,2,6,6-pentamethyl-4-piperidinyl)amino]-1,3,5-triazine-2-yl]imino-3,1-propanediyl]]bis[N',N''-dibutyl-N',N''-bis(1,2,2,6,6-pentamethyl-4-piperidinyl)-;

poly[6-[(1,1,3,3-tetramethylbutyl)amino]-s-triazine-2,4-
diyl][2,2,6,6-tetramethyl-4-piperidyl)imino]];

2,2,4,4-tetramethyl-7-oxa-3,20-diazadispiro[5.1.11.2]
heneicosan-21-one; and, 1,5-dioxapsiro-[5,5]-3,3-dicarboxylic acid, diester with
2,2,6,6-tetramethylpiperidin-4-al.

4. The method of claim 3 wherein said PDYL is represented by a structure in which at least one of said polysubstituted piperidyl groups is directly connected to a triazine ring.

5. The method of claim 2 wherein said 3,5-DHBZ is represented by a structure selected from the group consisting of

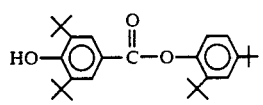 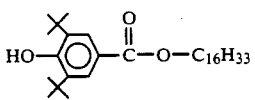

(II)

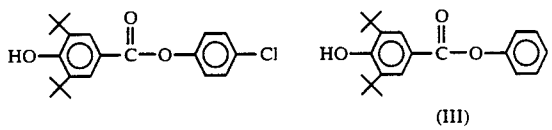

(III)

6. The method of claim 5 wherein said phthalocyanine pigment is selected from the group consisting of Blue 15, Blue 16 and Blue 29, and shades of blue, including Blue 15:1 through Blue 15:6; and, (b) Green 7, Green 36-3Y and Green 36-6Y, and combinations thereof; and said azo or disazo pigment is Red 144, and shades thereof.

7. The method of claim 6 wherein said phthalocyanine or azo or disazo pigment is present in an amount in the range from 20 ppm to about 1 phr; said PDYL is present in an amount in the range from 20 ppm to about 2 phr; and, said 3,5-DHBZ is present in an amount in the range from 20 phr to about 2 phr; based on the weight of said polyolefin.

8. The method of claim 3 wherein said film or fiber is formed by melt-extruding said polyolefin, and said melt includes a secondary stabilizer present in no more than a melt-stabilizing amount, no more than 0.1 phr.

9. The method of claim 8 wherein said polyolefin is selected from the group consisting of polypropylene homopolymer and a copolymer of propylene with a minor amount of ethylene; and said secondary stabilizer is selected from the group consisting of a hindered phenol and a phosphite.

* * * * *